UNITED STATES PATENT OFFICE.

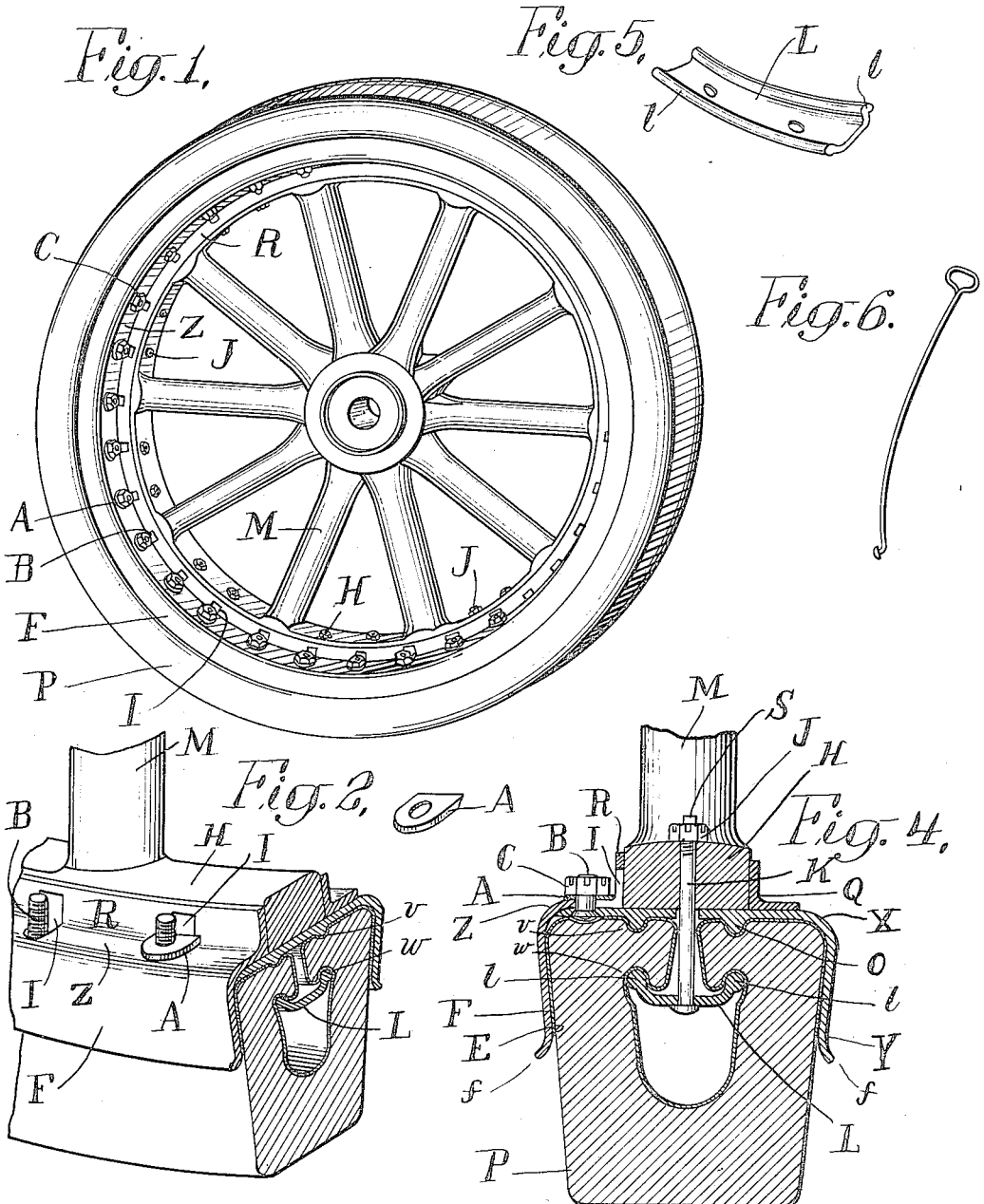

MAX CYRUS OVERMAN, OF NEW YORK, N. Y.

VEHICLE-WHEEL.

1,223,725.  Specification of Letters Patent.  Patented Apr. 24, 1917.

Application filed February 1, 1910, Serial No. 541,243. Renewed March 19, 1917. Serial No. 155,943.

*To all whom it may concern:*

Be it known that I, MAX CYRUS OVERMAN, a citizen of the United States, and resident of the borough of Manhattan, city, county, and State of New York, have invented certain new and useful Improvements in Vehicle-Wheels, of which the following is a specification.

My present invention relates to improvements in vehicle wheels and more particularly to means for perfectly securing the tire to the wheel and preventing it from creeping and at the same time permitting the removal and reattachment of the same or another tire in a highly convenient and expeditious manner. The invention is applicable to all forms of wheel whether resilient or otherwise.

In the drawings, which show one of the particular forms which my invention may take, Figure 1 is a perspective view of a wheel embodying my invention, Fig. 2 is a perspective view of one of the washers employed in the construction, Fig. 3 is a perspective view of a portion of the rim and tire in my connecting devices, Fig. 4 is a transverse section partly in elevation through the rim and tire and connecting devices, Fig. 5 is a perspective view of one of the clamping plates, and Fig. 6 shows one of the wires useful in assembling.

Describing now the devices of the drawings and reserving it to the claims to point out the novel features and to indicate the scope of the invention, it being understood that said claims will be interpreted with due and proper range of equivalents, P designates a tire shown attached to the felly H of a vehicle wheel whose spokes are designated M. The tire shown is in the form of an arch having inwardly directed base portions. Ordinarily, these base portions will be circumferentially continuous. Furthermore, each may have circumferential grooves $v$ and $w$ in its opposite faces for purposes hereinafter described.

X is a metal rim having an inwardly directed flange Q and an outwardly directed flange Y adapted to be secured to the felly H of the wheel in the relation shown with the metal rim X at the tread of the felly H and with the flange Q in contact with one side of said felly. This relation of metal rim and felly is maintained by any suitable means not shown, as for example, by bolts passed through the parts and holding them rigidly together. As to the metal rim itself, the preferred construction is that the inwardly directed flange Q be brazed to said rim X.

Z is a ring adapted to be bolted to the non-flange side of the main rim X and has an inwardly directed flange R contacting with the side of the felly H and an outwardly directed flange F corresponding with the similar flange Y and being located at the side of the tire.

It will be noted from Figs. 1 and 3 that the ring Z is secured to the rim X by a plurality of bolts projecting upwardly through the rim and thence through the ring Z which, for this purpose, is slotted (as best shown at I in Fig. 3) not only through its portion Z, but also through its inwardly directed flange R. The result is that when the nuts and washers, next to be described, have been removed from these bolts, the entire ring can be removed laterally from the wheel. On the other hand, when the ring has been put back into position, it may be secured rigidly in that position by dropping the washers A over the stems of the bolts and then applying the nuts C. This accomplishes the result because the washers A are so wide that they cannot pass through the vertical portion of the slot I, and in addition are long enough between the bolt and the flange R of the ring to keep said flange in contact with the felly and consequently to keep the entire ring rigidly held against lateral displacement.

The felly H and the metal rim X are perforated at intervals around the wheel with radially extending bolt-holes into which are received the stems of inwardly directed bolts K. These bolts support clamping plates L which, when the nuts J of the bolts are screwed up tight, serve to clamp the base portions of the tire against the rim. There will be a plurality of these clamping plates, each preferably more or less arc shaped, as shown in Fig. 5, to conform with the curvature of the wheel. Preferably also each clamping plate will have inwardly directed edges I receivable into the circular grooves or recesses $w$ in the outer side of the base portions of the tire.

O designates circumferential beads projecting from the outer face of the rim X, one or more on each side of the center to be received into the corresponding circumferential grooves $v$ already described in the inner face of the base portions of the tire.

Looking at the assembled tire in Fig. 4, it will thus be seen that its attachment to the wheel is such that it can neither pull off radially or laterally, nor can it creep. On the other hand, the devices are such that the tire is very easily removable and replaceable.

Thus, to remove the tire it is only necessary to remove the nuts J and C and then to take off the ring Z and after that the tire.

On the other hand, to attach the tire, the first operation will be to suspend the bolts K in their openings on the ends of wires, one of which is shown in Fig. 6. For this purpose, it will be noted that the outer ends of wires are provided with hooks receivable through eyes S in the ends of the bolts. Further, it will be noted that the opposite ends of the wires are too large to pass through the bolt openings and therefore the bolts are all held suspended ready to be drawn up into their position shown in Fig. 4 by pulling the wires inwardly toward the hub of the wheel.

The bolts having been suspended, the base portions of the tire are worked into the position shown in Fig. 4 between the clamping plates and the metal rim X. Thereupon, the bolts B for securing the ring Z are inserted into position. Next, the ring itself is put on and the washers A and nuts C applied. Finally, the bolts K having been drawn up into position by the wires, the nuts J are screwed on, and all of the nuts having been made properly snug, the attachment of the tire is complete.

The tire shown presents an unusually great depth of live rubber in a continuous vertical line between tread and rim. This secures correspondingly great supporting capacity, also resilience. On the other hand, lateral displacement of the tire in rounding corners and so forth is prevented by the side support offered by the relatively deep flanges F, the latter preferably rounding out at their free edges $f$.

What I claim is:—

1. In combination, a wheel rim, a ring telescoping over the free edge of said rim having an inwardly directed flange and an outwardly directed flange, the latter located at the side of the tire, bolt means extending radially relative to the wheel through the aforesaid rim and ring, the latter being slotted together with its inwardly directed flange to permit the stems of the bolts to pass when the ring is adjusted to the rim, and washers for said bolts which are non-passable through the slots and which engage the inwardly directed flange on the ring to hold it against lateral displacement.

2. In combination, a wheel rim, a ring telescoping over the free edge of said rim having an outwardly directed flange located at the side of the tire, bolt means extending radially relative to the wheel through the aforesaid rim and ring, the latter being slotted to permit the stems of the bolts to pass in adjusting the ring to the rim, washers for said bolts, and projections on said ring engaging said washers to prevent lateral displacement of the ring.

3. In combination, a wheel rim, a ring telescoping over the free edge of said rim having an outwardly directed flange located at the side of the tire, bolt means extending radially relative to the wheel through the aforesaid rim and ring, the latter being slotted to permit the stems of the bolts to pass in adjusting the ring to the rim, washers for said bolts, and means on the ring preventing its lateral displacement by engaging the periphery as distinguished from the face of the washers.

Witness my hand this 31st day of January 1910, at New York city, N. Y.

MAX CYRUS OVERMAN.

Witnesses:
E. W. SCHEN, Jr.,
ALAN C. McDONNELL.